Oct. 30, 1923.

O. SCHLAUPITZ

GAUGING INSTRUMENT

Filed Feb. 4, 1922  3 Sheets-Sheet 1

1,472,195

Inventor:
Oswald Schlaupitz
by Cunt Cann
His Attorneys.

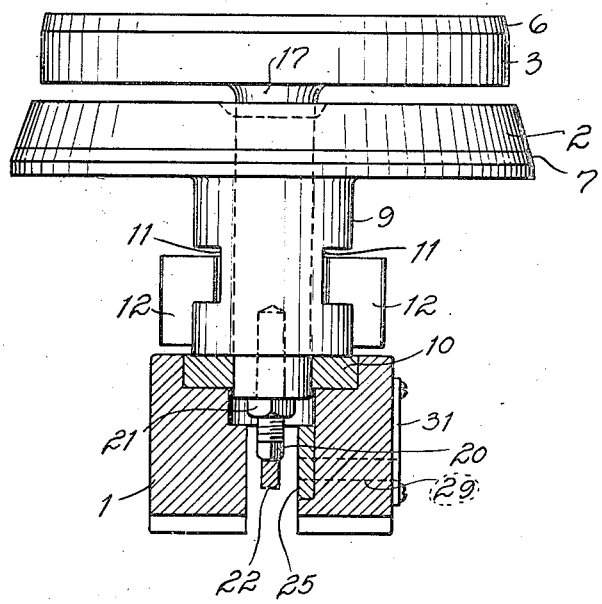
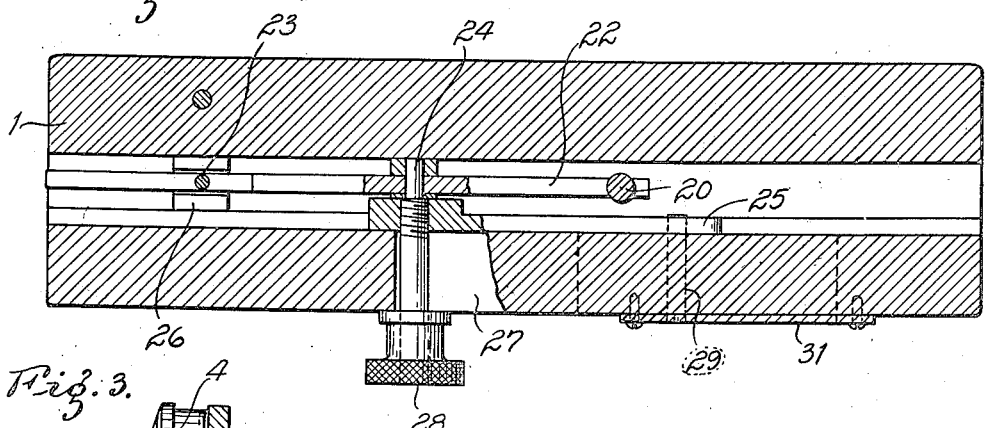
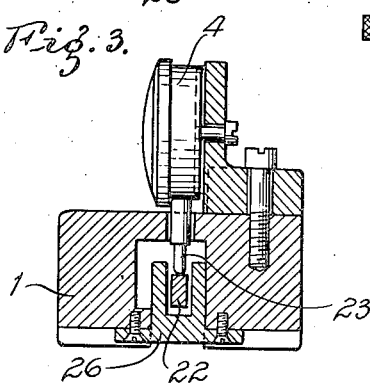

Oct. 30, 1923.  1,472,195

O. SCHLAUPITZ

GAUGING INSTRUMENT

Filed Feb. 4, 1922  3 Sheets-Sheet 3

Inventor:
Oswald Schlaupitz
Attorneys.

Patented Oct. 30, 1923.

1,472,195

UNITED STATES PATENT OFFICE.

OSWALD SCHLAUPITZ, OF CANTON OHIO, ASSIGNOR TO THE TIMKEN ROLLER BEARING COMPANY, OF CANTON, OHIO, A CORPORATION OF OHIO.

GAUGING INSTRUMENT.

Application filed February 4, 1922. Serial No. 534,065.

*To all whom it may concern:*

Be it known that I, OSWALD SCHLAUPITZ, a citizen of the United States, and a resident of the city of Canton, county of Stark, and State of Ohio, have invented a new and useful Improvement in Gauging Instruments, of which the following is a specification.

My invention relates to a machine for gauging the taper of cups and the like; and its principal object is to produce a simple and accurate taper gauging device, and to provide for the adjustment thereof for the gauging of various tapers. It consists in the combinations and arrangements of parts hereinafter described and claimed.

In the accompanying drawing, wherein like numerals refer to like parts wherever they occur, Fig. 1 is a side elevation of my device with certain of the inside parts indicated in dotted lines;

Fig. 2 is a vertical view partly in elevation and partly in section on the plane indicated by the line 2—2 in Fig. 1 and looking to the right;

Fig. 3 is a vertical view partly in elevation and partly in section on the plane indicated by the line 3—3 in Fig. 1;

Fig. 5 is a horizontal section on the line 5—5 of Fig. 1;

Figure 1:
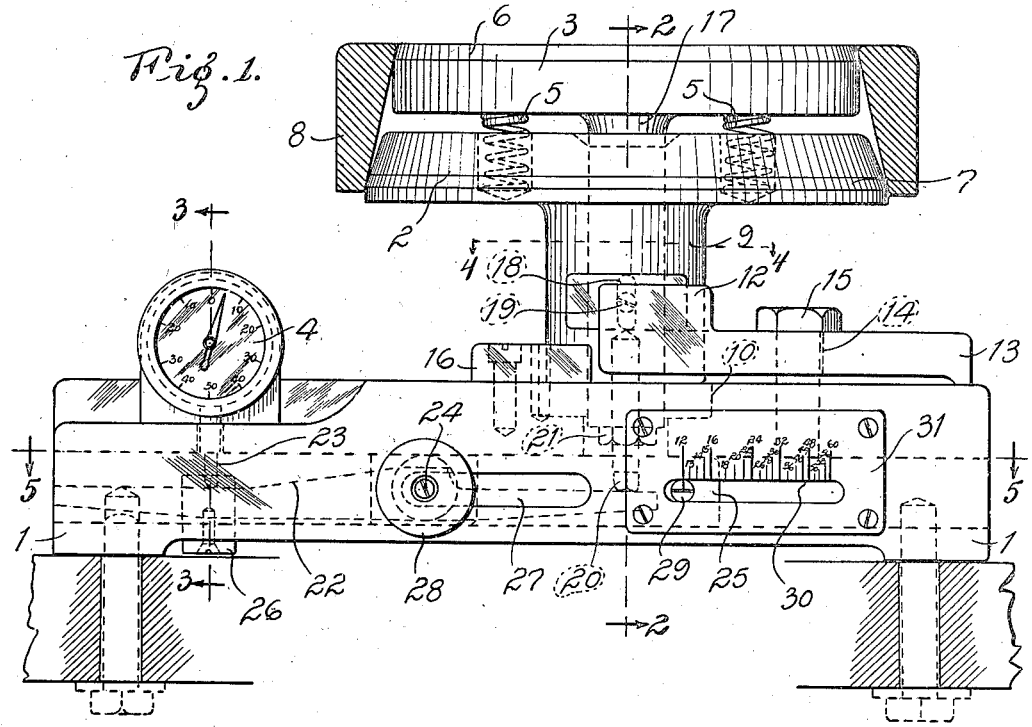
Figure 4:
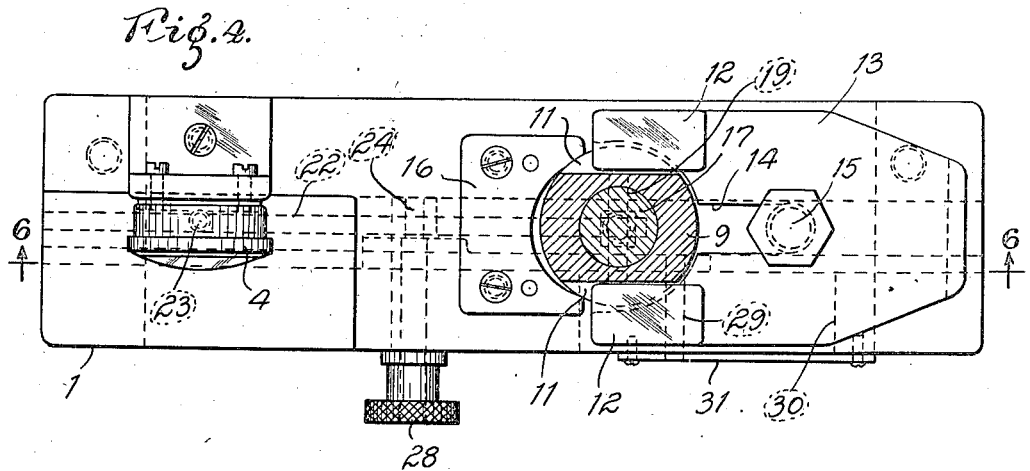
Fig. 4 is a horizontal view partly in plan and partly in section on the plane indicated by the line 4—4 in Fig. 1.
Figure 6:
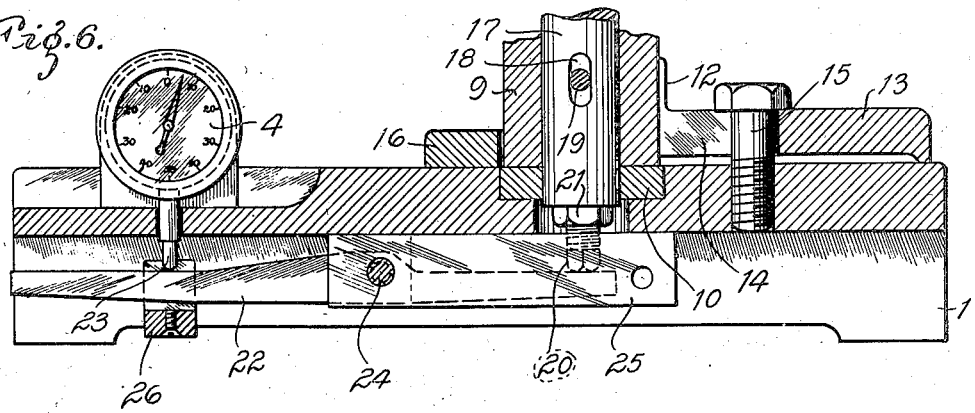
Fig. 6 is a vertical longitudinal section on the line 6—6 in Fig. 4.

The base 1 of my device comprises a support for the gauging elements 2 and 3, a support for a dial or indicator 4 and a support for means for transmitting motion from the gauging elements to the indicator.

The gauging elements comprise a stationary conical or tapered head 2 of circular section, hereinafter designated as the stake, and an element 3 of circular section movable axially with relation to the stake and hereinafter designated as the plunger. The movable element 3 is of smaller diameter than the diameter of the gauging portion of the stake 2 and is resiliently supported above said stake by suitable springs 5. The upper edge portion of the plunger 3 is beveled off to provide a conical band 6 accurately concentric with the conical gauging portion 7 of the stake 2. When a conical cup 8 is applied to such gauge, the narrower portion of its inner surface bears against the gauging band 6 of the movable plunger 3, which is normally held in its upper position by the springs 5; and in such position the cup 8 is clear of the stake 2. When, however, downward pressure is applied to the cup 8, the springs 5 yield and the plunger 3 is moved downwardly until a portion of the inner surface of the cup 8 near its larger end bears against the tapered head of the stake 2 and is accurately centered thereby in contact with the gauging band 7 of said stake. As the diameters of the gauging portions of both the plunger 3 and the stake 2 are fixed, and as the vertical or axial movement of the plunger, which starts when the cup engages the gauging band thereof, continues until the surface of larger diameter engages the gauging band of the stake, the angle of taper is readily determined. For practical purposes, it is desirable to use a separate pair of gauging elements, namely stake 2 and plunger 3, for each size and taper of cup; and for this reason, the gauging elements are preferably made removable.

The stake 2 comprises a thick column or shank portion 9 whose lower end is ground to rest on the ground upper surface of a hardened ring 10 provided therefor in the upper surface of the base 1. On diametrically opposite sides of this column are formed slots or grooves 11 to receive the laterally projecting lugs 12 on one end of a bifurcated clamping plate 13, whose opposite end bears on the top of the base. This clamping plate 13 has a vertical slot 14 through which extends a clamping bolt 15 whose lower end works in a thread provided therefor in the base 1. By this arrangement, the clamping plate 13 serves to hold the stake 2 firmly in position. In order to accurately position the column 9 of the stake, a locater plate 16 is secured to the top of the base. This locater plate has one side formed into a groove against both sides of which the shank of a stake will bear when its axis is in proper position of adjustment. Thus, a stake may be quickly and easily removed and replaced with another stake.

The movable plunger 3 has an elongated axial shank 17 that has a working fit in an axial bore provided therefor in the shank or column 9 of the stake. Preferably the column 9 of the stake is provided with a longitudinally extending slot 18 in which fits a screw 19 that projects transversely from the shank 17 of the plunger 3, so that the amount of axial movement of the plunger relative to the stake is limited; and both stake and plunger may be removed from the base as a unit. The plunger 3 is held in its upper position by means of a number of coil springs 5 which bear against its lower surface and are seated in sockets provided therefor in the upper surface of the head of the stake 2. The lower end of the shank 17 of the plunger has a threaded axial bore therein and in this bore works a threaded adjusting pin 20 that has a lock nut 21 thereon to hold it in adjusted position. The lower end of said pin 20 is rounded off to co-operate with a lever 22 whose outer end contacts with a similar pin 23 that is operatively connected to the indicating mechanism. This indicating mechanism is of any well known type and it is believed unnecessary to describe the details thereof. As illustrated herein, it comprises a dial 4 with a scale having a zero point which corresponds to the normal taper and having graduations in both directions from said zero point to indicate excessive taper or insufficient taper respectively. The pointer that cooperates with said scale is mounted on a shaft or arbor to which motion is transmitted from the lever 22 and pin 23 through any suitable transmission system.

It is noted that with a given pair of gauging elements, there is a fixed difference between their radii and consequently a fixed difference between the radii of the cup at the zones of contact of said elements therewith. On the other hand, the distance between the gauging bands of the two gauging elements will vary with the taper. With a given pair of gauging elements, the indicating finger of the dial should point to zero on the scale when a master cup of the diameter and taper required is applied to the gauging elements; and this condition can be effected by proper adjustment of the adjusting screw.

As the taper or angle is determined by the ratio which the fixed difference between the radius of the stake 2 and the radius of the plunger 3 bears to the variable vertical distance between the points of contact of the cup with the stake and the plunger, that is to say by the trigonometrical tangent of the angle, the lever is adjustably mounted so that the gauge may be used with a wide range of variation in the taper of the cup. For this purpose, the fulcrum pin 24 of the lever is pivotally secured to a slide bar 25 which is mounted in horizontal guide-ways provided therefor on the base 1. A bifurcated guard 26 whose arms constitute a guide for the lever is secured to the base, preferably under the pin 23 of the indicating mechanism so as to position the lever accurately with respect to said pin. The fulcrum pin 24 of the lever 22 projects through a horizontal slot 27 in the base and is provided with a knurled thumb screw 28 that works thereon and serves to clamp the fulcrum pin 24 in adjusted position. The rear end of the slide bar 25 also has a threaded pin 29 in its side which projects through an elongated slot 30 provided therefor in the side of the base. Mounted on said base above said slot is a plate 31 that has graduations thereon in position for the scale pin 29 to register with in its various adjusted positions. This scale is preferably marked to correspond with the degrees of taper of the master cups that are made to the required taper. That is to say, the scale is marked to indicate the angle of taper, and the successive graduations of the scale bear the relation of the tangents of the respective angles.

It is noted that the distance between the point at which the adjusting pin 20 bears on the lever 22 and the point at which the lever bears against the indicating mechanism pin to transmit motion to the indicator pin over the dial 4, is a fixed distance; and that the shifting of the pivot point of the lever 22 lengthens one arm thereof by exactly the same amount that it shortens the other arm thereof, and a scale indicating the various angles of taper is made with reference to this fact. Thus, when a pair of gauging elements suitable for gauging a taper of approximately 12°, for instance, is used, the pivot point is located more nearly midway between the points of contact of the lever with the adjusting pins than is the case when the gauging elements are adapted for gauging higher angles of taper. By properly adjusting the pivot point of the lever with reference to the standard of any particular pair of gauging elements, the same amount of variation from the standard will be indicated by the same reading of the scale, and thus the same instrument may be used with different gauging elements for gauging widely different tapers.

Figure 7:
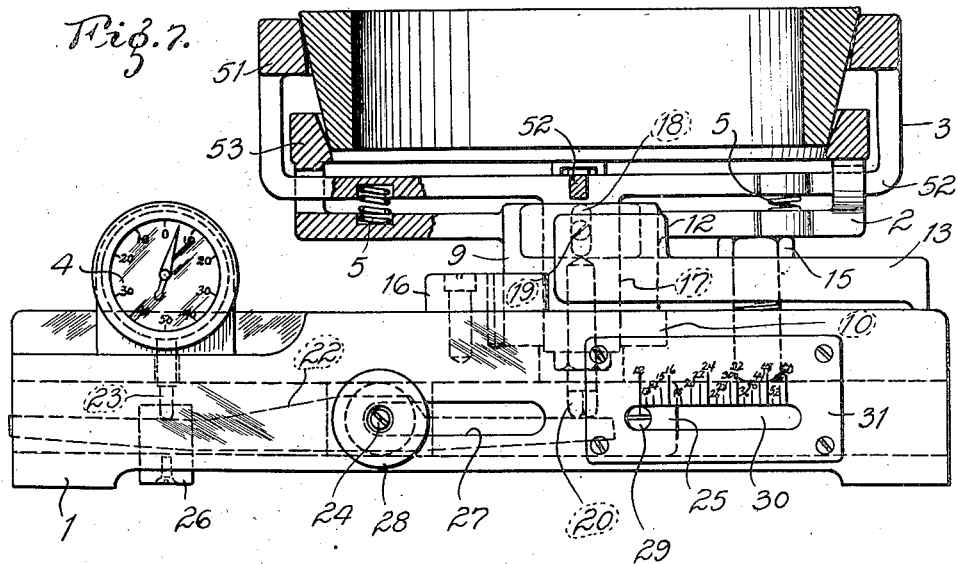
Fig. 7 is a view similar to Fig. 1 showing a modified form of device, suitable for gauging the outside taper of cones.

The modification illustrated in Fig. 7 is designed for gauging the taper of the outside surfaces of cones and the like. In this construction, the shank 17 of the plunger 3 is mounted in the axial bore of the column or shank 9 of the stake 2 as above described; but the plunger head is made in the form of an annular band 51 which is mounted on a spider or a series of arms 52 that are fixed to and integral with the shank and extend through vertically elongated slots provided therefor in the tubular portion of the stake 2. In this construction, the plunger is made to gauge the wider portion of the cone, and the stake is made to gauge the narrower portion thereof; and in this case, the gauging band of the plunger is made by beveling off the upper inner edge of the plunger ring 51. Likewise, the gauging portion of the stake is made in the form of an annular ring or rib 53 whose inner face is coned or tapered downwardly. Otherwise, the modification is similar to the construction above described. In operation, the cone whose outer surface is to be gauged is passed, with its small end downwardly, through the plunger ring until its surface comes into proper cooperative relation with the gauging band of the plunger; and then the cone is pressed downwardly until its surface comes into cooperative relation with the gauging band of the stake. This movement is transmitted as above described to the indicating dial.

The above described gauging mechanism permits the gauging of articles of widely different sizes and tapers with a single indicating mechanism. By reason of the adjustable feature, a given reading of the indicator always means the same variation from the desired degree of taper. The taper surface is measured directly and variations in other parts of the article have no effect on the taper gauging operation. The device is simple, effective and rapid in operation.

Obviously numerous changes may be made without departing from my invention and I do not wish to be limited to the precise construction shown.

What I claim is:

1. An instrument for gauging tapers comprising two axially alined gauging elements both adapted to simultaneously gage the diameter of an article at different points in its length, said gauging elements being relatively axially movable, an indicator and means for transmitting such relative movement to such indicator.

2. A gauging instrument comprising axially alined relatively movable gauging elements both adapted to simultaneously gage the diameter of an article at different points in its length, an indicator, and means for transmitting such relative movement to said indicator, said means comprising an endwise adjustable lever.

3. An instrument for gauging tapers comprising two axially alined gauging elements both adapted to simultaneously gauge the diameter of an article at different points in its length, said gauging elements being relatively axially movable, an indicator and means for transmitting such relative movement to such indicator, and means for limiting the relative movement of said gauging elements.

4. An instrument for gauging tapers comprising two axially alined gauging elements both adapted to simultaneously gauge the diameter of an article at different points in its length, said gauging elements being relatively axially movable, an indicator, means for transmitting such relative movement to such indicator and means tending to force said gauging elements away from each other.

5. An instrument for gauging tapers comprising two axially alined gauging elements both adapted to simultaneously gauge the diameter of an article at different points in its length, said gauging elements being relatively axially movable, an indicator, means for transmitting such relative movement to such indicator and springs interposed between said gauging elements.

6. A gauging instrument comprising relatively movable gauging elements both adapted to simultaneously gauge the diameter of an article at different points in its length, an indicator, means for transmitting such relative movement to said indicator, said means comprising an endwise adjustable lever, and a scale whereby said lever may be properly positioned.

7. In a device of the kind set forth, a pair of gauging elements, one of said gauging elements comprising a gauging portion of circular cross section and a column having an axial bore, and the other of said gauging elements comprising a gauging portion of circular cross section and a shank portion that is disposed in the axial bore of the column of said first gauging element.

8. In a device of the kind set forth, a pair of gauging elements, one of said gauging elements comprising a circular gauging portion and a column having an axial bore, the other of said gauging elements comprising a circular gauging portion and a shank portion that is disposed in the axial bore of the column of said first gauging element, said first gauging element having a plurality of sockets therein and springs in said sockets bearing against the under surface of said second gauging element.

9. In a device of the kind set forth, a pair of gauging elements, one of said gauging elements comprising a gauging portion of circular cross section and a column having an axial bore, and the other of said gauging elements comprising a gauging portion of circular cross section and a shank portion that is disposed in the axial bore of the column of said first gauging element, the column of said first gauging element having a slot extending lengthwise thereof and the shank of said second gauging element having a screw that fits in said slot.

10. An instrument for gauging tapers comprising a base, two axially alined gauging elements removably mounted on said base, said gauging elements being relatively axially movable, an indicator, adjustable means for transmitting such relative movement to said indicator and a scale whereby said transmitting means may be properly positioned for different size of gauging elements.

11. An instrument for gauging tapers comprising a base, two gauging elements removably mounted on said base, said gauging elements being relatively axially movable, an indicator, adjustable means for transmitting such relative movement to said indicator and a scale whereby said transmitting means may be properly positioned for different sets of gauging elements, said scale being graduated according to the degrees of taper of master cups of known taper.

12. An instrument for gauging tapers comprising a base, two gauging elements removably mounted on said base, said gauging elements being relatively axially movable, an indicator, means for transmitting such relative movement to said indicator, said means comprising an endwise adjustable lever, a scale graduated according to the degrees of taper of master cups of known taper and a slide bar secured to and movable with said lever, said slide bar having a pin that cooperates with said scale to indicate the degree of taper that the lever is properly positioned for.

13. A taper gauging instrument comprising a base, an indicator, a gauging element removably mounted on said base, said gauging element having an axial bore, a second gauging element having a shank portion that is mounted in the bore of said first mentioned gauging element, whereby said gauging elements are relatively axially movable, and means for transmitting such relative movement to said indicator, both of said gauging elements being adapted to simultaneously gauge the diameter of an article at different points in its length.

14. A taper gauging instrument comprising a base, an indicator, a gauging element removably mounted on said base, said gauging element having an axial bore, a second gauging element having a shank portion that is mounted in the bore of said first mentioned gauging element, whereby said gauging elements are relatively axially movable, means for transmitting such relative movement to said indicator, said means comprising an endwise adjustable lever, and a scale mounted on said base whereby said lever may be positioned properly.

Signed at Canton, Ohio, this 27th day of January, 1922.

OSWALD SCHLAUPITZ.